United States Patent [19]
Iwasaki

[11] Patent Number: 5,784,159
[45] Date of Patent: Jul. 21, 1998

[54] OPTICAL SPECTRUM MEASURING APPARATUS

[75] Inventor: Takashi Iwasaki, Tokyo, Japan

[73] Assignee: Ando Electric Co., Ltd., Tokyo, Japan

[21] Appl. No.: 768,991

[22] Filed: Dec. 18, 1996

Related U.S. Application Data

[63] Continuation of Ser. No. 530,476, Sep. 19, 1995, abandoned.

[30] Foreign Application Priority Data

Sep. 30, 1994 [JP] Japan ..................... 6-261737

[51] Int. Cl.$^6$ .......................................... G01J 3/28
[52] U.S. Cl. ............................................. 356/328
[58] Field of Search ........................ 356/326, 328, 356/330–334, 305, 308

[56] References Cited

U.S. PATENT DOCUMENTS

| | | |
|---|---|---|
| 3,822,941 | 7/1974 | Roche et al. . |
| 4,225,233 | 9/1980 | Ogan . |
| 4,732,476 | 3/1988 | Barshad . |
| 4,776,695 | 10/1988 | van Pham et al. ............ 356/334 X |

FOREIGN PATENT DOCUMENTS 0 277 720  8/1988  European Pat. Off. .

Primary Examiner—K. Hantis
Attorney, Agent, or Firm—Finnegan, Henderson, Farabow, Garrett & Dunner, L.L.P.

[57] ABSTRACT

An optical spectrum measuring apparatus is disclosed that is able to take measurements at high speed. An encoder is connected to the rotational axis of a motor. A counter counts the number of pulses outputted from the encoder 14. A comparator, that is connected to the counter and a register, compares a value stored in the counter with a value stored in the register set by a control section, and outputs an AD conversion signal when the values are equal. The control section sets the register with a value corresponding to a first measurement point and rotates a diffraction grating at a constant speed from an angle corresponding to a measurement initiation wavelength to an angle corresponding to a measurement termination wavelength. An AD conversion signal is outputted from the comparator when a measurement point is reached, then the control section sets the register to a value corresponding to the next measurement point.

3 Claims, 4 Drawing Sheets

OPTICAL SPECTRUM MEASURING APPARATUS

This application is a continuation, of application Ser. No. 08/530,476, filed Sep. 19, 1995 now abandoned.

BACKGROUND OF THE INVENTION

1. Field of the Invention

The present invention relates to an optical spectrum measuring apparatus for measuring the optical spectrum characteristics of a light source.

2. Description of the Related Art

Below, a conventional optical spectrum measuring apparatus as shown in FIG. 4 will be explained. FIG. 4 shows a light source 1, an incident light slit 2, a concave surface mirror 3, a diffraction grating 4, a concave surface mirror 5, an outgoing light slit 6, an optical detector 7, an amplification circuit 8, an AD converter 9, a motor 10, a drive circuit 11, a control section 12, and a display section 13. The incident light slit 2, the concave surface mirror 3, the diffraction grating 4, the concave surface mirror 5, and the outgoing light slit 6 form an assembly known as a "Czerny-Turner-type" dispersion spectroscope.

In this example, a beam from the light source 1 is incident on the incident light slit 2. The light that passes through the incident light slit 2 is converted into a parallel beam by the concave surface mirror 3, and is incident on the diffraction grating 4. A plurality of grooves are formed on the surface of the diffraction grating 4. The diffraction grating 4 can be rotated over an arbitrary angle around an axis parallel to these grooves by means of the motor 10. The drive circuit 11 changes the angle of the diffraction grating 4 by controlling the motor 10 according to instructions from the control section 12.

From the above mentioned parallel beam, the diffraction grating 4 reflects only diffracted light of a particular wavelength component determined by the angle of diffraction grating 4, in the direction of the concave surface mirror 5. The concave surface mirror 5 images the diffracted light onto the outgoing light slit 6. Only the wavelength components falling within the width of the outgoing light slit 6 are able to pass through the outgoing light slit 6.

The optical detector 7 receives the light passing through the outgoing light slit 6, and converts the light into an electrical signal proportional to the optical intensity. The amplification circuit 8 amplifies the output of the optical detector 7 to a voltage appropriate to input to the AD converter 9. The AD converter 9 converts the output of the amplification circuit 8 into a digital signal.

The control section 12 sets the wavelengths that pass through the outgoing light slit 6 by sending instructions to the drive circuit 11 for changing the angle of the diffraction grating 4, and receives the optical intensity of the outgoing light by means of the output of the AD converter 9. The control section 12 sweeps the wavelengths passing through the outgoing light slit 6 from a measurement initiation wavelength to a measurement termination wavelength, and displays the repetitively obtained wavelength and intensity characteristics on the display section 13 as an optical spectrum.

However, with this conventional composition for an optical spectrum measuring apparatus, it is necessary to stop the diffraction grating 4 at each point of measurement when sweeping the wavelength of passage through the outgoing light slit 6 from the measurement initiation wavelength to the measurement termination wavelength. Consequently, there is a problem in that when the number of measurement points increases, a large amount of time is expended in taking such measurements.

SUMMARY OF THE INVENTION

It is therefore an object of the present invention to provide an optical spectrum measuring apparatus which is able to take measurements at a high speed.

In order to attain the above mentioned object, the present invention provides an optical spectrum measuring apparatus comprising a diffraction grating; a motor that rotates the diffraction grating; an optical detector that receives diffracted light from the diffraction grating and converts the diffracted light to electrical signals; an AD converter that converts the electrical signals to digital signals; a control section that sets a rotational angle of the motor and receives values from the AD converter; an encoder connected to a rotational axis of the motor; a counter connected to an output end of the encoder; a register that stores a value set by the control section; and a comparator that outputs an AD conversion signal to the AD converter when a value stored in the counter and the value stored in the register are equal.

With the optical spectrum measuring apparatus of the present invention, it is possible to take high-speed measurements by taking the measurements while rotating the diffraction grating from a measurement initiation wavelength to a measurement termination wavelength at a constant speed.

DESCRIPTION OF THE PREFERRED EMBODIMENTS

Figure 1:
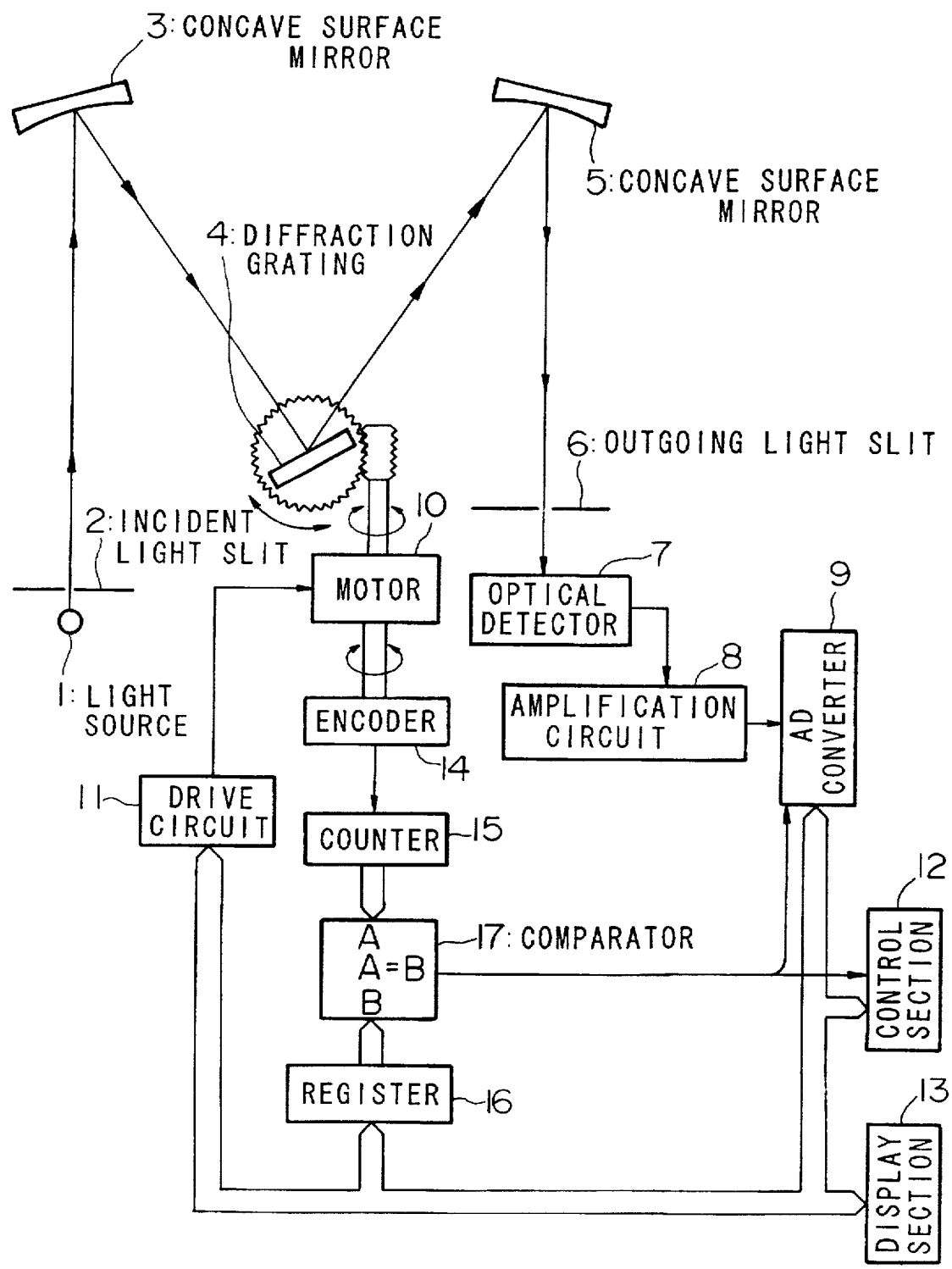
FIG. 1 is a diagram illustrating the composition of an optical spectrum measuring apparatus according to the first embodiment of the present invention.

Hereinbelow, an optical spectrum measuring apparatus according to the first embodiment of the present invention will be described with reference to FIG. 1. In FIG. 1, an encoder 14, a counter 15, a register 16, and a comparator 17 are included in addition to the elements shown in FIG. 4.

As illustrated in FIG. 1, the encoder 14 is connected to the axis of rotation of the motor 10, and outputs a series of pulses, the number of which is proportional to the rotational angle of the motor 10. The counter 15 counts the number of pulses output from the encoder 14. Therefore, the value stored in the counter 15 corresponds to the rotational angle of the motor 10 and the diffraction grating 4. The value stored in the counter 15 also corresponds to the wavelength of light passing through the outgoing light slit 6.

Additionally, the register 16 is connected to the control section 12, and stores an arbitrary value received from the control section 12. The comparator 17 is connected to the counter 15 and the register 16, and compares the value stored in the counter 15 with the value stored in the register 16. When the two values become equal, the comparator 17 outputs a trigger pulse. The output of the comparator 17 is sent to the AD converter 9 as an AD conversion signal. Consequently, an AD conversion is performed by the AD converter 9 when the values held in the counter 15 and the register 16 become equal. Additionally, the comparator 17 is also connected to the control section 12, whereby the control section 12 is notified of the initiation of an AD conversion.

With regard to the actual circuit composition, it is possible to use an integrated circuit that combines the counter 15, the register 16, and the comparator 17, such as model ZEN-2011, produced by Zenic Corporation.

Next, a measurement procedure using an optical spectrum measuring apparatus having the composition shown in FIG. 1 will be explained.

First, the control section 12 moves the diffraction grating 4 so as to allow the passage of a wavelength close to the measurement initiation wavelength, and loads the register 16 with a value corresponding to the first measurement point. Then, the drive circuit 11 rotates the diffraction grating 4 at a constant speed so that the wavelength of the outgoing light approaches the measurement termination wavelength.

When the angle of the diffraction grating 4 reaches the first measurement point, the values stored in counter 15 and register 16 become equal. Therefore, an AD conversion signal is output from the comparator 17 to the AD converter 9, and an AD conversion is performed. An AD conversion signal is simultaneously outputted to the control section 12. When the control section 12 detects the AD conversion signal, the control section 12 receives the measured value of the optical intensity from the AD converter 9, and loads the register 16 with a value corresponding to the next measurement point.

When the angle of the diffraction grating 4 reaches the next measurement point, an AD conversion signal is outputted from the comparator 17 in a similar manner, and the control circuit 12 performs a procedure identical to that described above. By repeating this procedure until the measurement termination wavelength is reached, it is possible to measure the wavelength and optical intensity characteristics of every measurement point without having the control section 12 stop the motor 10. After measurements have been taken at all the measurement points, the control section 12 stops the motor 10 by means of the drive circuit 11.

Next, the composition of an optical spectrum measuring apparatus according to the second embodiment of the present invention will be explained with reference to FIG. 2. The composition shown in FIG. 2 includes a delay circuit 18 in addition to the elements shown in FIG. 1 and is able to resolve the following problems.

With the composition of the first embodiment, if the time required for the control circuit to process measuring data from a single measurement point is $T_{min}$, then the rotational speed of the motor must be set at a speed such that the output pulse spacing of the comparator 17 is longer than $T_{min}$. For example, if the number of pulses between the measurement initiation wavelength and the measurement termination wavelength is 10,000, and the number of measurement points is 1,001, then assuming the spacing between the measurement points is equal, the spacing is 10 pulses. In this case, the output pulse spacing of the comparator 17 is constant because the spacing between the measurement points is constant. Therefore, the rotational speed of the motor 10 should be set so that the output pulse spacing of the comparator 17 is longer than $T_{min}$.

However, if for example, the number of pulses between the measurement initiation wavelength and the measurement termination wavelength is 1,500 and the number of measuring points is 1,001, then if the spacing between the measuring points is equal, the spacing for each measurement point would be 1.5 pulses. In this case, in order to allow the counter and the register to handle only integers, the spacing for each measurement point must be set at either 1 or 2 pulses. As a result, the output pulse spacing of the comparator 17 becomes irregular, so that rotational speed of the motor 10 must be set so that the shortest pulse spacing is always longer than $T_{min}$, causing the measurement time to become longer.

In this way, with the composition of FIG. 1, when the spacing between the measurement initiation wavelength and the measurement termination wavelength is short, and the number of pulses therebetween is not sufficiently large with respect to the number of measurement points, the output pulse spacing of the comparator 17 becomes dispersive, so that it is not possible to increase the rotational speed of the motor 10. Additionally, since the output pulse spacing of the comparator 17 becomes dispersive when the rotational speed of the motor 10 is irregular, it is also not possible to increase the rotational speed of the motor 10 in this case.

Figure 2:
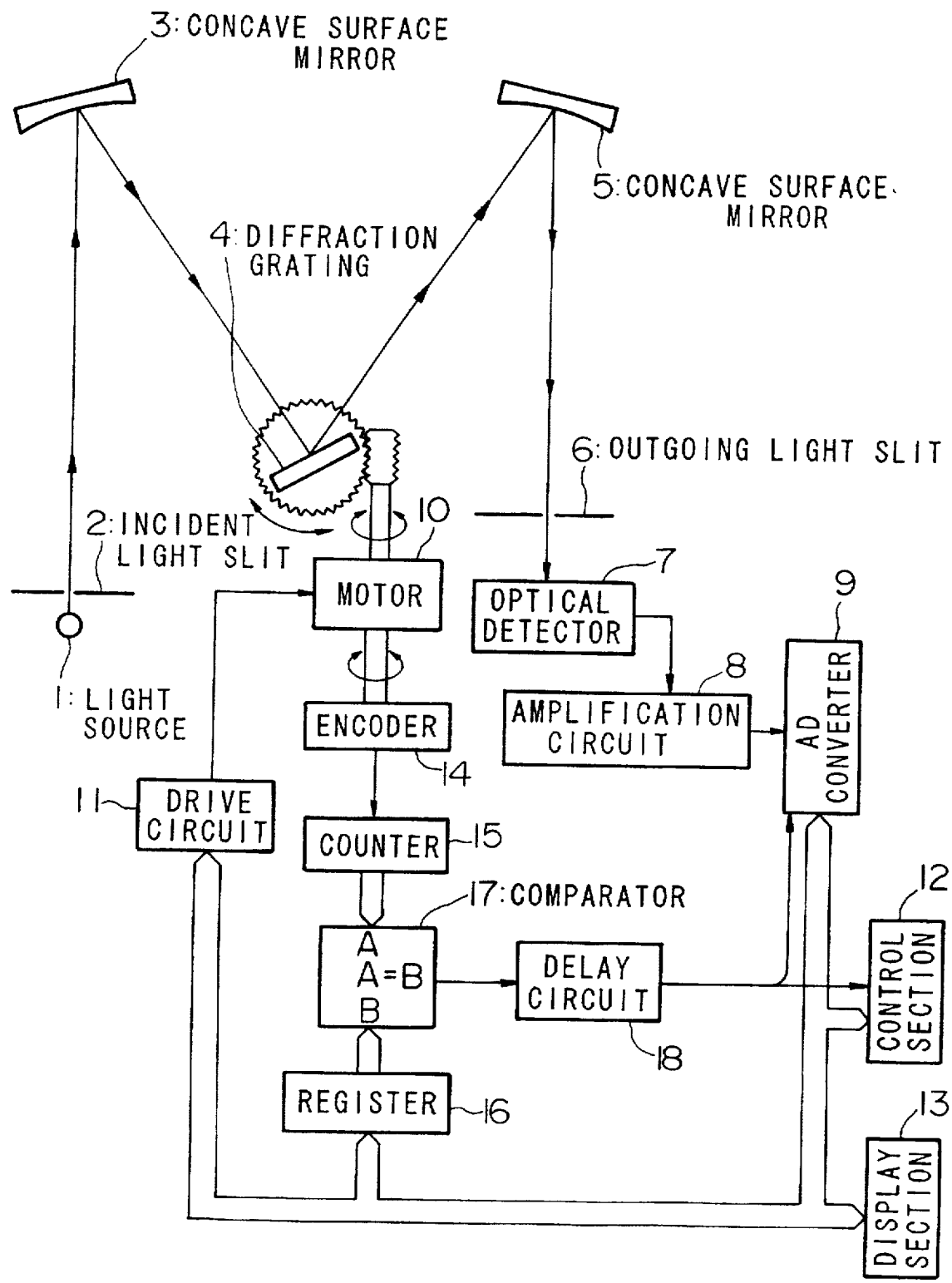
FIG. 2 is a diagram illustrating the composition of an optical spectrum measuring apparatus according to the second embodiment of the present invention.

As shown in FIG. 2, the delay circuit 18 is connected between the comparator 17 and the AD converter 9 in the control section 12. If the comparator 17 outputs two consecutive pulses having spacings T such that $T<T_{min}$, the delay circuit 18 delays the second pulse by $T-T_{min}$, so that the spacing between the two pulses is maintained at $T_{min}$. Therefore, with the addition of a delay circuit 18, the rotational speed of the motor 10 is able to be set in such a way that the average pulse spacing is longer than $T_{min}$, even when there are irregularities in the pulse spacing, allowing a reduction in the measurement time.

Figure 3:
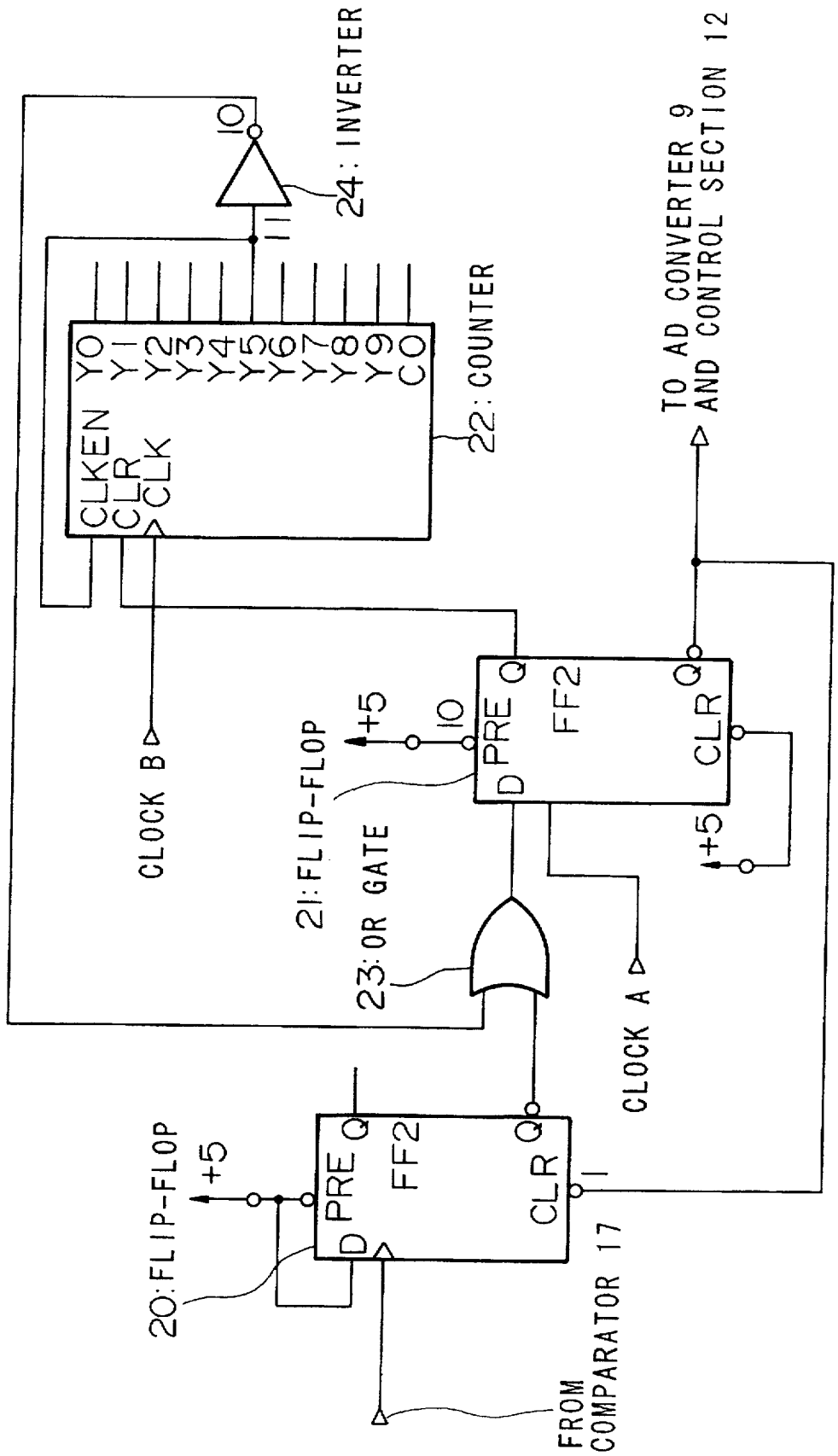
FIG. 3 is a diagram illustrating an example of the composition of a delay circuit used in the second embodiment of the present invention.

As an example of a delay circuit 18, the one shown in FIG. 3 comprising flip-flops 20 and 21, counter 22, OR gate 23, and inverter 24, can be used. In a delay circuit 18 with this composition, a pulse outputted from the comparator 17 is stored in the flip-flop 20. The output of the flip-flop 20 is stored in the flip-flop 21 in synchronization with clock A and is also outputted to the AD converter 9 and the control section 12. At this time, the counter 22 begins counting.

If the next pulse is sent to the flip-flop 20 while the counter 22 is still counting, the output is postponed by the OR gate 23 until the count is finished. After the count is finished, the output of the flip-flop 20 is input to the flip-flop 21. Then, the output is stored in the flip-flop 21 in synchronization with clock A and is sent to the AD converter 9 and the control section 12. Consequently, by setting the count time of the counter 22 to T by adjusting the frequency of clock B, which determines the count number of the counter 22, then the minimum spacing of the pulses outputted to AD converter 9 and the control section 12 can be made equal to T.

In the embodiments described above, the diffraction grating 4 and the motor 10 can be connected either by means of gears or by direct contact. Additionally, while a Czerny-Turner-type optical configuration was utilized in the above-described embodiments, other types of optical configurations are also possible, such as the Littrow-type and the double-pass-type configurations.

Figure 4:
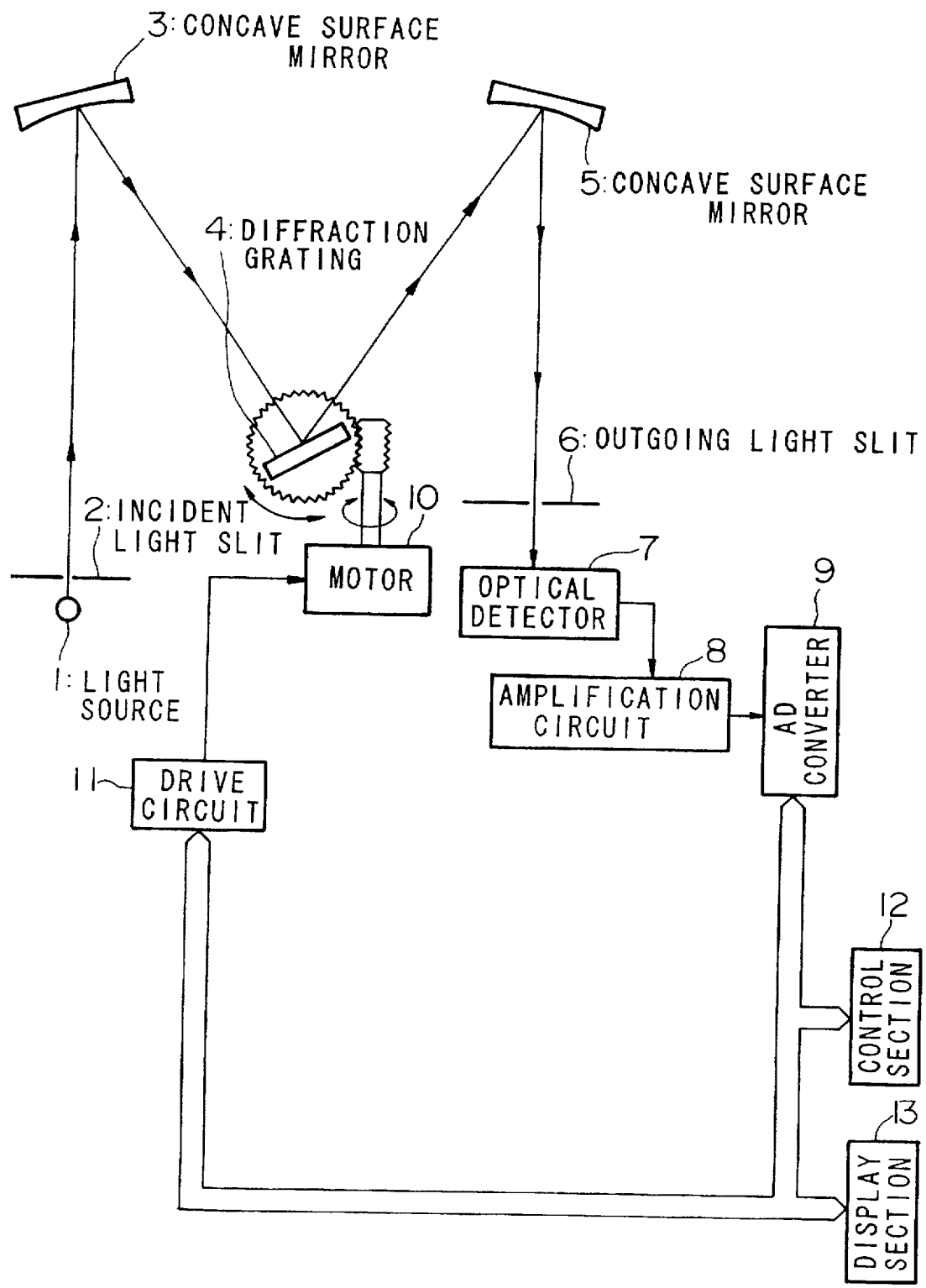
FIG. 4 is a diagram illustrating a conventional optical spectrum measuring apparatus.

The inventors have confirmed experimentally that while a conventional optical spectrum measuring apparatus as shown in FIG. 4 required 10 seconds to take some given measurements, an optical spectrum measuring apparatus according to the first embodiment could take the same measurements in under 1 second, and an apparatus according to the second embodiment could take the same measurements in under 0.5 seconds.

What is claimed is:

1. An optical spectrum measuring apparatus comprising:

a diffraction grating for receiving light from a predetermined optical source and for outputting a diffraction beam containing only specific wavelength components determined by a rotational angle of said diffraction grating;

optical detecting means for outputting an electrical signal in response to said diffraction beam from said diffraction grating;

rotation means for rotating said diffraction grating;

encoding means for outputting pulses, the number of said pulses depending on the rotational angle of said diffraction grating rotated by said rotation means;

counting means for counting the number of pulses outputted by said encoding means;

register means for registering a predetermined value;

comparing means for comparing whether or not a count value of said counting means and said predetermined value of said register means are equal;

A/D conversion means for A/D converting said electrical signal output by said optical detecting means when said comparing means determines that said count value and said predetermined value are equal;

output means for outputting an optical spectrum from said predetermined optical source based on an electrical signal A/D converted by said A/D conversion means;

assigning means for assigning said a new predetermined value to said register means; and repetition means for causing said assigning means to assign said new predetermined value each time said comparing means determines that said count value and said stored value are equal.

2. The optical spectrum measuring apparatus according to claim 1, further comprising delay means, wherein said comparing means outputs pulses when said count value and said predetermined value are equal, said A/D conversion means A/D converts the electrical signal outputted by said optical detecting means when said pulses are inputted, and said delay means maintains time intervals between the pulses outputted by said comparing means at a constant value.

3. The optical spectrum measuring apparatus according to claim 2, wherein said delay means comprises:

first register means for storing pulses outputted by said comparing means;

second register means for outputting said pulses stored in said first register means to said A/D conversion means in synchronization with a predetermined clock signal;

counting means for counting for a predetermined time period from when said second register means outputs said pulses; and prohibiting means for prohibiting output of said pulses from said first register means to said second register means until said counting means counts for said predetermined time period.

\* \* \* \* \*

UNITED STATES PATENT AND TRADEMARK OFFICE
CERTIFICATE OF CORRECTION

PATENT NO. : 5,784,159
DATED : July 21, 1998
INVENTOR(S) : Takashi IWASAKI

It is certified that error appears in the above-identified patent and that said Letters Patent is hereby corrected as shown below:

Title page, item [57], in the Abstract, line 4, after "encoder", delete "14".

Claim 1, column 5, line 32, after "assigning", delete "said".

Signed and Sealed this

Seventeenth Day of August, 1999

Q. TODD DICKINSON

Attest:

Attesting Officer

Acting Commissioner of Patents and Trademarks